United States Patent
Junell (10) Patent No.: US 6,181,755 B1
(45) Date of Patent: Jan. 30, 2001

(54) RECEIVER SYNCHRONISATION IN IDLE MODE

(75) Inventor: Jari Junell, Vantaa (FI)

(73) Assignee: Nokia Mobile Phones Ltd., Espoo (FI)

( * ) Notice: Under 35 U.S.C. 154(b), the term of this patent shall be extended for 0 days.

(21) Appl. No.: 08/858,990

(22) Filed: May 20, 1997

(30) Foreign Application Priority Data

May 21, 1996 (FI) .................................................... 962138

(51) Int. Cl.$^7$ .................................................... H04L 7/04
(52) U.S. Cl. .......................................... 375/362; 375/365
(58) Field of Search .................................... 375/354, 357, 375/365, 366, 367

(56) References Cited

U.S. PATENT DOCUMENTS

| | | | |
|---|---|---|---|
| 4,499,434 | 2/1985 | Thompson | 331/17 |
| 5,214,687 | 5/1993 | Kansakoski et al. | 379/60 |
| 5,276,691 | 1/1994 | Kivari | 371/47.1 |
| 5,373,507 | 12/1994 | Skold | 370/105.1 |
| 5,570,369 | * 10/1996 | Jokinen | 370/95.3 |
| 5,619,542 | * 4/1997 | Gurney et al. | 375/371 |

FOREIGN PATENT DOCUMENTS

0618687 A3    10/1994  (EP) .

07250120    9/1995  (JP) .

* cited by examiner

*Primary Examiner*—William Luther
(74) *Attorney, Agent, or Firm*—Perman & Green, LLP (57) ABSTRACT

A receiver is synchronised to a signal by studying which among the previously calculated responses to known synchronisation errors corresponds to the response of a real, received signal. A sample sequence decimated from an oversampled signal is compared to model sequences which correspond to decimation at a different distance from the optimum decimation point, and in further processing the employed decimation point is used according to how far from optimum the best correlated model sequence is situated. From the phase angles of the samples, there is calculated an average phase angle change per symbol, and on the basis of that and the known symbol rate, the frequency error in the reception is determined. For each sample of the data burst, there is calculated an individual phase correction by multiplying the individually defined average phase shift per symbol by the distance from a given symbol corresponding to a phase reference value, and by adding the result to said phase reference value. Bursts are received in groups, and timing and frequency errors are predicted on the basis of the trends indicated by preceding groups in order to receive the next group. A unit formed of several groups is used for measuring and predicting the change in the doppler frequency.

22 Claims, 6 Drawing Sheets

RECEIVER SYNCHRONISATION IN IDLE MODE

BACKGROUND OF THE INVENTION

1. Field of the Invention

The invention relates to a method for synchronising a receiver with a signal, said signal having a frequency which is not accurately known in advance.

2. Description of the Prior Art

In such radio communications systems that have several data transmission frequencies and variable uses with respect to area and/or time, the receiver must, prior to beginning the reception properly, find the desired signal and synchronise its operation in order to interpret the content of the signal. Finding the signal means that the receiver is tuned to exactly that frequency where the signal is located. In the synchronisation process the receiver must find out where each separate symbol pertaining to the signal begins, and how the frequency and phase are changed during reception.

The present application pays special attention to the I-CO Global Communications satellite telephone system, which is based on ten communications satellites with a so-called medium-high orbit (roughly 10,000 km). The satellites orbit the earth at regular intervals on two mutually perpendicular orbits with an inclination of 45°. Each satellite comprises an antenna arrangement with a power pattern of 121 narrow radiation lobes, which together cover the coverage area of said satellite on earth. The coverage area means the whole area Erom which the satellite is seen more than 10 degrees above the horizon. The operational range of the system is roughly 2 GHz, and it utilises TDMA, Time Division Multiple Access.

As a concept, the system defines a so-called CCS carrier (Common Channel Signalling), which means a given carrier frequency reserved for signal acquisition, synchronisation and distribution of general communications information. Globally there are reserved 120 frequencies for CCS carriers, and these frequencies are further grouped into regional and local frequencies. When a certain satellite moves on its orbit, its coverage area moves along the surface of the earth. The satellite changes the transmitted CCS frequencies in between the separate radiation lobes, so that in a given geographic area, there are always received the same frequencies. A receiver located on earth or near the surface of the earth stores the eight location-connected local CCS frequencies to a non-volatile memory; consequently, when it is switched off and back on, it searches a signal among said eight frequencies. If a signal is not found, the receiver next surveys the 40 regional frequencies, and if there still is no signal, finally all 120 global frequencies.

Figure 1:
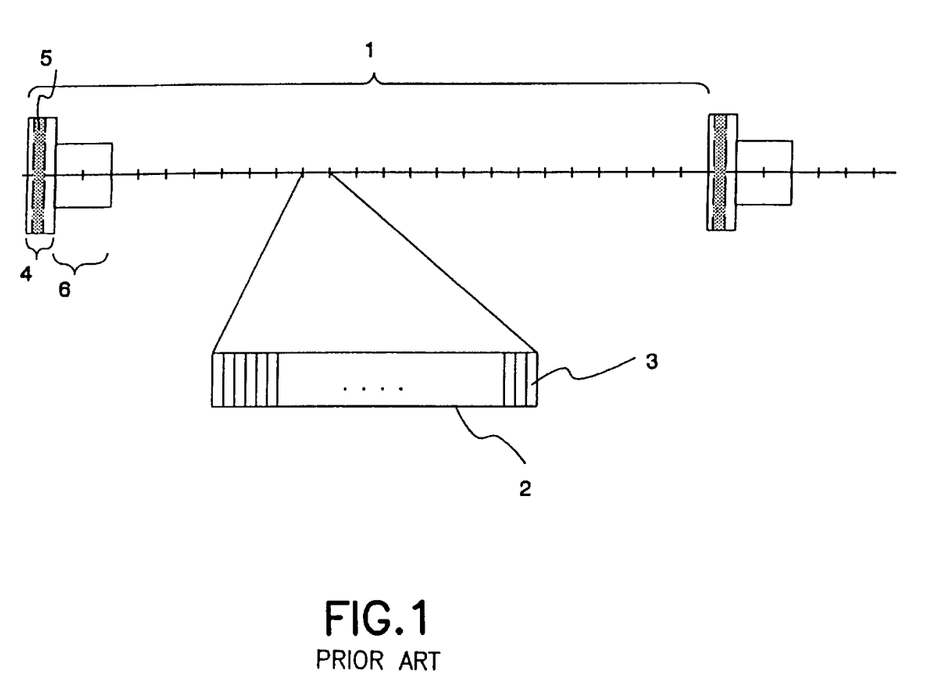
FIG. 1 illustrates a known distribution over time of a transmission in the CCS carrier of the I-CO Global Communications satellite telephone system.

According to FIG. 1, a transmission with each CCS frequency consists of several multiframes 1, which are divided into 25 slots 2. Each slot includes 120 symbols 3. According to current definitions, the symbol rate in the system is 18,000 symbols per second, but it may be increased to 36,000 symbols per second in the future. The first slot in the frame comprises a BCCH (Broadcast Control Channel) burst 4, which is BPSK (Binary Phase Shift Keying) modulated and contains, among others, communications data and a 32 symbols long reference sequence 5, which is important for synchronisation. The location and form of the reference sequence inside the BCCH burst will be essentially fixed and known. Two successive slots contain a FCH (Frequency Channel) burst 6, which is transmitted with a somewhat lower level than the BCCH burst and consists of pure sinus wave at the frequency of said CCS channel; the purpose of said FCH burst 6 is to aid the synchronisation of the receiver. Other slots in the CCS carrier are empty.

For successful reception, the receiver must, after being switched on, first find the desired signal. General criteria for the signal to be found is that the timing error in the reception is ±½ symbols at the most, and that the frequency error is no more than a few percentages of the symbol rate. The nearer to zero these two error factors are, the smaller the probability that bit errors happen in the reception, and the less the reception is sensitive to the deterioration of the S/N ratio. An advantageous method for fulfilling these criteria is introduced in U.S. patent application "Signal acquisition in a satellite telephone system" filed simultaneously with the present application and by the same applicant under Ser. No. 08/859,500.

Problem to be Solved:

After finding the signal, however, the problem is how to further diminish the timing and frequency errors from the above described coarse values, and how synchronisation is maintained in a system where the transmission or link stations (satellites) and receivers (mobile terminals) move with respect to each other at varying speeds causing doppler shift of the reception frequency and phase error. According to current usage experiences, a moving terminal of a data transmission system, such as a mobile telephone, is most of the time in idle mode, where power is switched on but the user is not in active communication with anybody. Low electricity consumption is an important factor in mobile terminals, and therefore the receiver should be switched on as rarely as possible during the idle mode which condition is, however, contradictory to the aim to accurately maintain the synchronisation. Other factors affecting the on-state periods of the receiver are various standards and definitions pertaining to individual data transmission systems and dealing with the reception of a call or a system message by the receiver without immoderate delay. Moreover, it is advantageous for reducing the complexity of the receiver and for cutting production costs if the synchronisation does not require a very high calculation capacity of the receiver device.

OBJECTS OF THE INVENTION

The object of the present invention is to introduce a method for synchronising a receiver in idle mode, which method requires only a relatively low calculation capacity of the receiver. Another object of the invention is that the need to keep the receiver switched on in order to maintain synchronisation is small.

The objects of the invention are achieved by using a known response of the receiver for various discrete synchronisation errors and by correcting the synchronisation according to how the reception situation corresponds to previously analysed error situations.

SUMMARY OF THE INVENTION

The method according to the invention is characterised in that it uses a known response of the receiver for known synchronisation errors in order to improve the demodulation of the signal.

The method according to the invention consists of several steps, some of which are essential for the invention in practical realisation whereas others can be replaced by alternative procedures known in the prior art. In the description below, there will be particularly pointed out those steps that are required by a successful creation and maintenance of synchronisation, but which in practical realisation are not essential for the invention suggested in the present application.

The relatively small calculating capacity needed in the method of the invention is largely based on the fact that the receiver's response to various discrete error situations is known in advance. In order to correct timing error, it has been calculated in advance what kind of result follows from the decimation of an oversampled signal with a known form, when the receiver uses different decimation points for eliminating the oversampling. The real sample sequence obtained from the decimation of a received real signal is compared to reference sequences, the number of which is equal to the number of possible decimation points. The reference sequence that best corresponds to the real sample sequence indicates how much the employed decimation point deviates from the optimum, in which case the decimation of a successive oversampled sample stream is corrected to take place at the optimum point.

In order to define the reference value of the phase error in a received signal, the receiver studies the results obtained from the I and Q receiver branches. The known response of the receiver to various phase errors is that the constellation points describing the complex samples of the sample stream are rotated with respect to the axes of the phase coordinates. The correction of phase errors is carried out by multiplying the received samples by the conjugate values of the respectively calculated phase errors.

Synchronisation also includes the detection and correction of frequency error. In the method according to the invention, the receiver estimates the frequency error by using the known symbol rate and the detected phase shift per symbol. Thus the receiver response is expressed in the complex samples of each symbol as a rotation of the phase from one symbol to another, and the correction is carried out by adjusting the digital oscillator of the receiver, which oscillator produces the mixing-frequency oscillation needed in the baseband mixing. Errors contained in samples received at an erroneous frequency can be corrected by calculation, in similar fashion as was described above, in the case of phase errors.

BRIEF DESCRIPTION OF THE DRAWINGS

The invention will be described in more detail below, with reference to a preferred embodiment an appended drawings, where.

DETAILED DESCRIPTION OF THE PREFERRED EMBODIMENT

FIG. 1 was already dealt with in the description of the prior art above; in the following description of the invention and its preferred embodiments we shall mainly refer to FIGS. 2–4.

Figure 2:
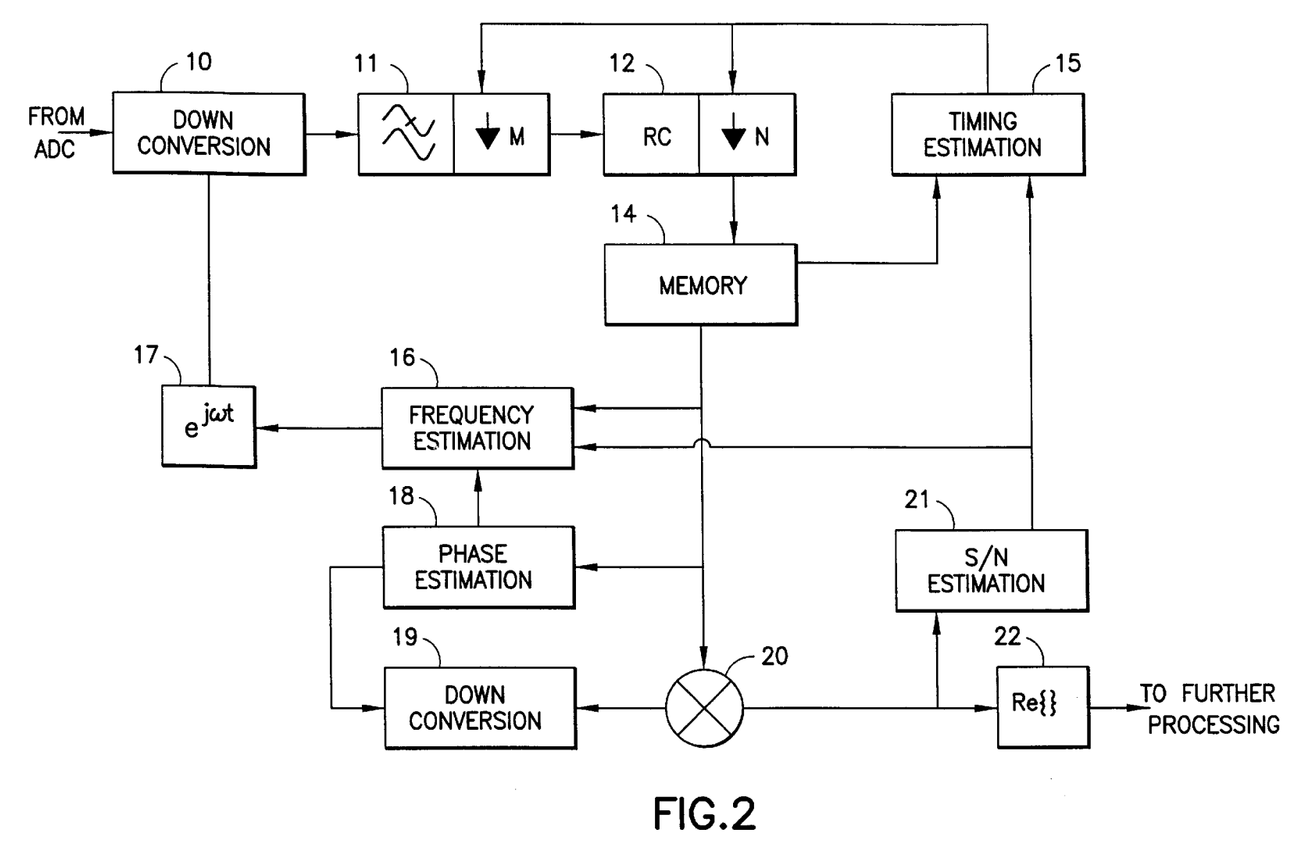
FIG. 2 is a schematic flow diagram of the method according to the invention.

FIG. 2 shows a simple block diagram of the synchronisation of the receiver. The signal downconversion, filtering and decimation blocks 10, 11 and 12 represent prior art technology. The signal part received at each point of time is recorded in the memory 14 for further processing. The timing estimation block 15 studies the sample sequences recorded in the memory and participates, in a way described below, in the selection of the decimation points in blocks I1 and 12. The frequency estimation block 16, which also studies the sample sequences recorded in the memory, affects in block 17 in the formation of the mixing frequency used in the downconversion. A frequency correction is, however, carried out only when a sufficient amount of statistic material is obtained of the received signal. The phase estimation block 18 studies the phase angle of complex samples and calculates the reference value and the required correction for the phase, together with the phase correction block 19. The phase estimation block 18 also finds out the average phase shift per symbol, so that this information and the known symbol rate can be used in forming the frequency error data in the frequency estimation block 16. The signal phase correction takes place by multiplying, in the multiplication unit 20, the samplewise phase correction by the samples of the sample sequence read from the memory. The S/N block 21 estimates the signal to noise ratio in the obtained result, which ratio is then fed to the timing estimation block 15 and to the frequency estimation block 16. The real part of the phase corrected results is given in block 22, whereafter the signal is conducted to other known parts of the receiver to be processed further.

In the first step of the method according to the invention, the receiver corrects the timing error to be smaller than the ±0.5 symbols at the most, presumed as the starting point. The correction is based on the fact that when coming from an A/D converter, the received signal, which is mixed to baseband and converted to digital form in an A/D converter, is many times oversampled. In other words, the output of the A/D converter is a sample stream containing for example eight times as much samples as in the known symbol rate of the system. One of these eight sampling points corresponds the correct symbol synchronisation better than the rest, wherefore the decimation of the sample stream should be timed, of the eight possible decimation points, with the one that renders the best possible result. If the timing of the decimation goes wrong, the adjacent symbols of the received signal cause so-called crosstalk, i.e. mutual interference in the demodulated signal.

Because the form of the reference sequence contained in the received BCCH bursts is known, in the method according to the invention there is calculated in advance what kind of decimated complex sample stream is obtained, if the decimation is carried out separately at eight possible decimation points. These so-called model sequences show the mutual interference caused by the known symbols of the reference sequences with each timing error. It is recommendable to choose the size of the model sequence so that one or several bits at the beginning and end of the reference sequence are ignored, because otherwise timing errors would cause mutual interference also from symbols immediately preceding or succeeding the reference sequence, and these symbols are not known. Most advantageously the number of ignored bits is equal to the length of the delay of the decimation filters in symbols. The model sequences can be numbered, for instance from 0 to 7, from 1 to 8 or from −3 to 4. Said numbers are below called ordinals of the decimation points. Moreover, the model sequences are mutually normalized, so that the dot product of each model sequence with itself is larger than the dot product with any other model sequence.

Figure 3:
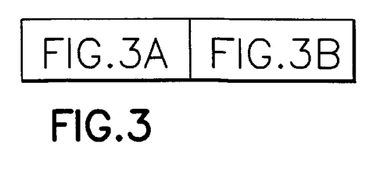
FIG. 3 is a flow diagram of the timing error correction according to the invention.
Figure 3A:
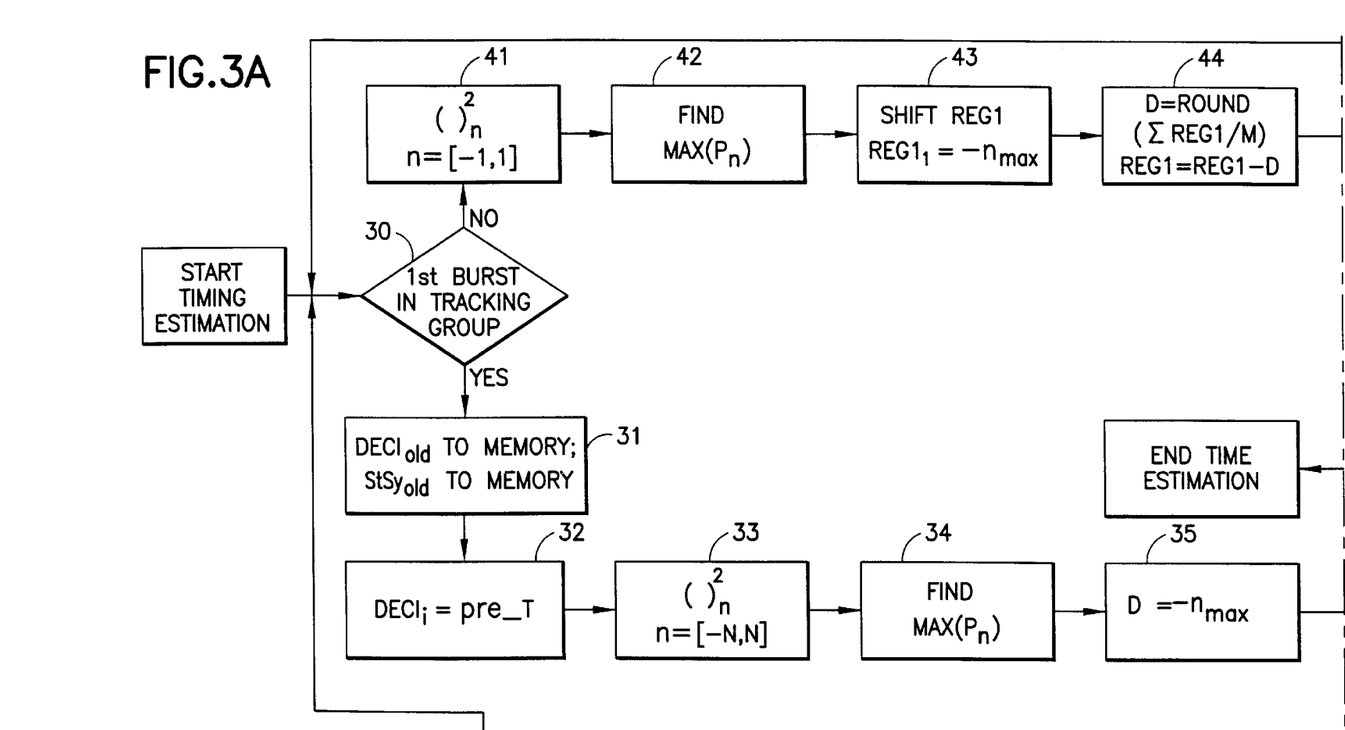
Figure 3B:
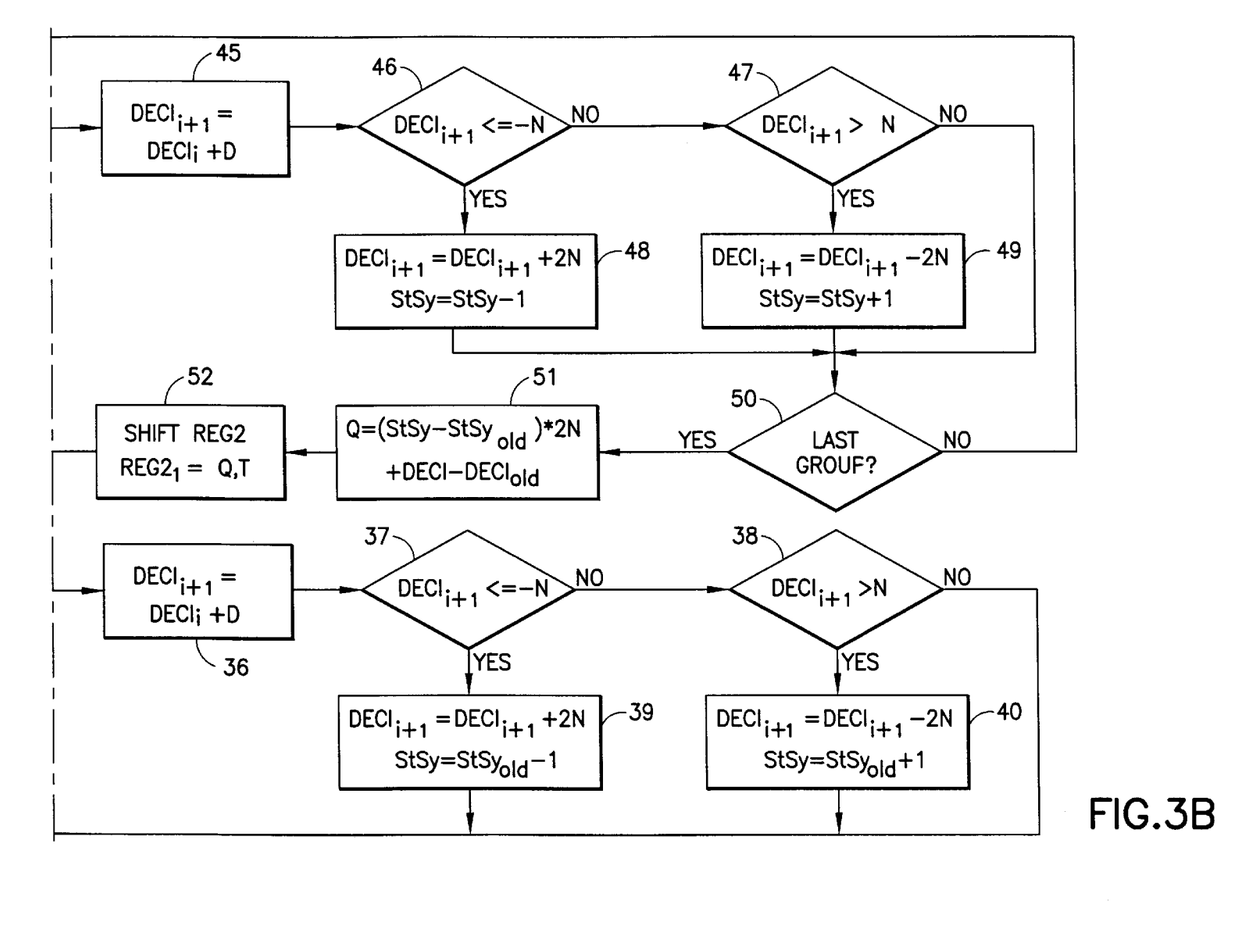
Figures 4, 4A:
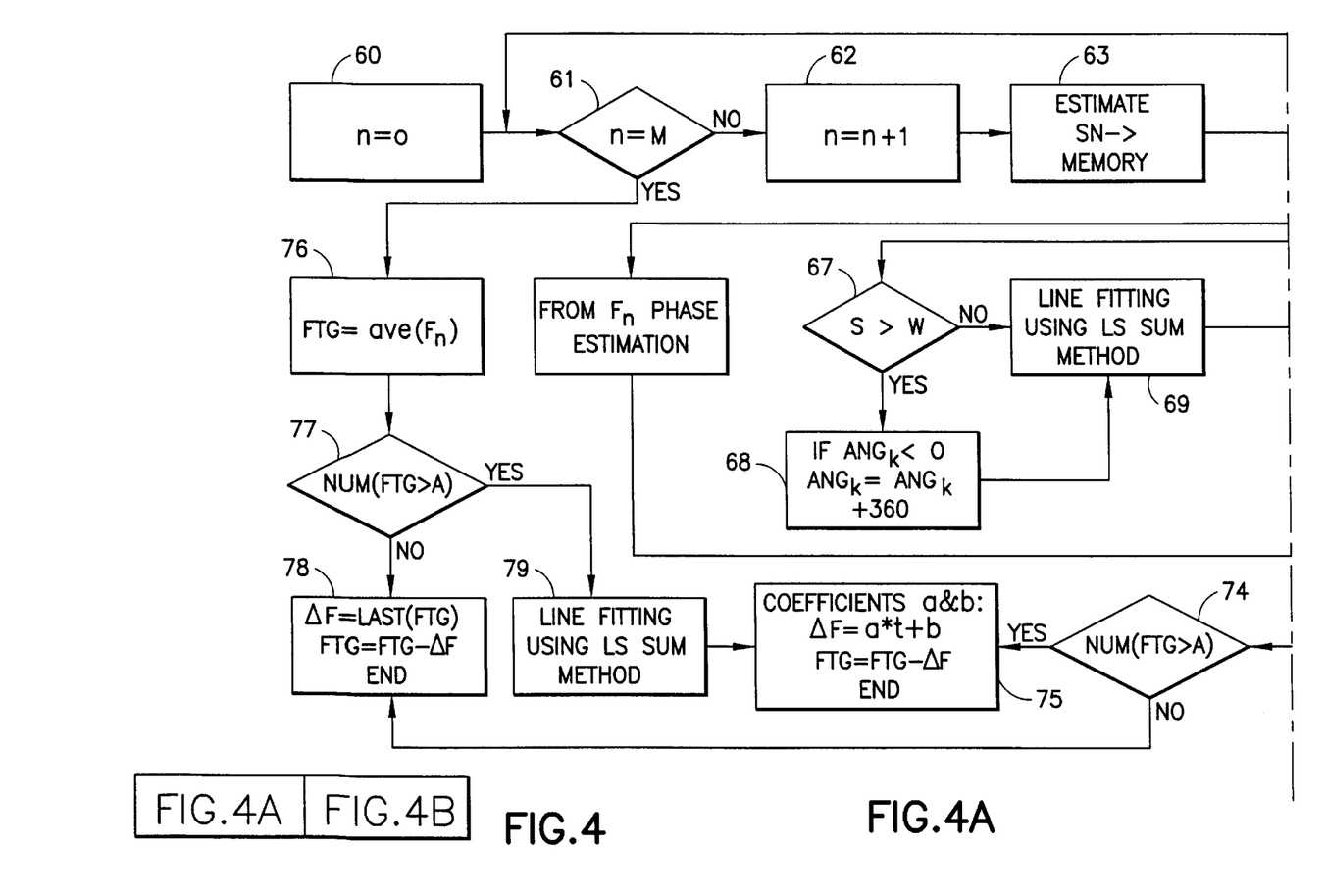
FIG. 4 is a flow diagram of the calculation procedure of the prediction parameters used in the method according to the invention.
Figure 4B:
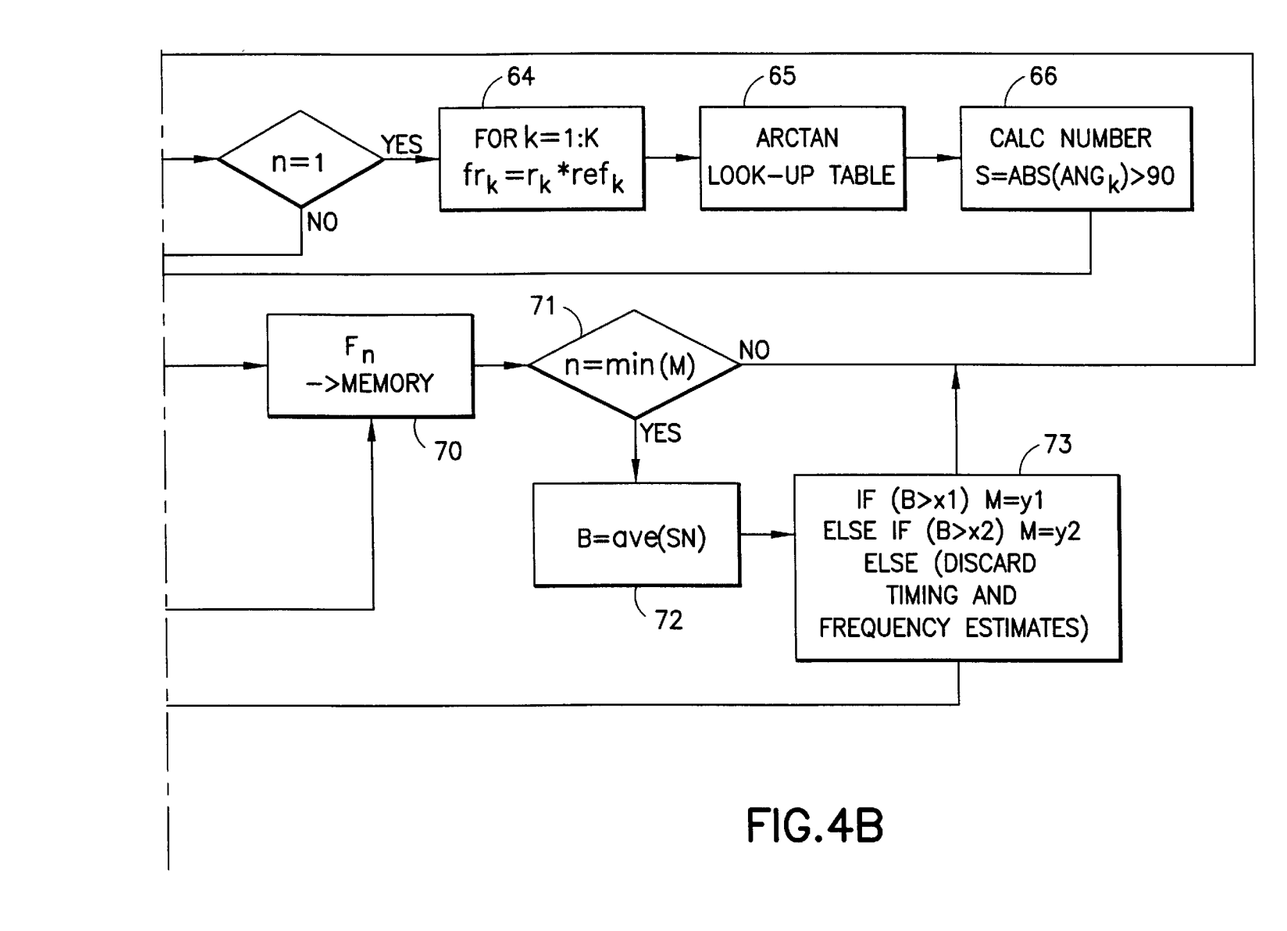

FIG. 3 is a programmatic block diagram of the timing error estimation in the method according to the invention. The treatment differs depending on whether the timing error estimation is started at the beginning of the received burst group, simply at the reception of a reference sequence (blocks in the bottom part of FIG. 3), or is it a continuation for a timing estimation already started in the same burst group (blocks in the top part of FIG. 3). This is decided in the block 30. We shall first describe timing estimation started at the beginning of a burst group.

Certain parameters, explained in more detail below, are initialised in blocks 31 and 32. In order to determine the decimation timing error, the receiver receives from a given BCCH burst a section corresponding to the reference sequence. At the beginning and end of the section, a given number of bits is ignored as was explained above. The receiver calculates the dot product of the remaining reference sequence separately with each model sequence and separately for the signals of both the I and Q branches in block 33. The results from the I and Q branches corresponding to each given model sequence are squared and summed up, so that there are obtained eight different power values $P_n$, each corresponding to a different model sequence, i.e. to a different timing error in decimation (n is an index describing the ordinal of the decimation point). The highest power value, which is acquired in block 34, means that the received and decimated reference sequence best corresponds to that model sequence with which the calculated dot product gave this power value. Because the decimation timing errors corresponding to the different model sequences are known, the obtained result tells how many eighth parts of the symbol interval the decimation point must be shifted, and to which direction. This result is marked as D in block 35. It is obvious that if the oversampling after the A/D converter is some other multiple of the symbol rate than eight, the number eight used in the above description is changed to correspond to the real amount of oversampling.

As the initial situation in synchronisation started for the first time, the signal tracking procedure may also render two possible correct symbol synchronisation points, which possibility is not described in FIG. 3. This is generally due to the fact that the timing error in decimation is about half a symbol, in which case the coarse symbol synchronisation included in the signal acquisition process cannot distinguish on which side of the employed decimation location the correct decimation point is situated. Now it is most advantageous in the method according to the invention to carry out the above described multiplication by model sequences and the comparison of obtained power values separately to both alternative symbol synchronisation points. As a result, there is obtained both the knowledge as to which of the two alternative decimation points is the right one, and the desired correction of the decimation time.

In a preferred embodiment, the next step in the method according to the invention is the estimation of the frequency error, i.e. of the rotation of the constellation points. The same received reference sequence is used here as above, in the calculation of the timing error. Several alternative methods can be applied. For instance, the receiver can calculate the angle which is formed in between the complex sample values of the I and Q branches and the positive real axis of the phase coordinates. Without phase error, and when the transmitted material is BPSK modulated and modulation removed in the receiver processing, the values produced by the I branch should in theory be located on the positive real axis, i.e. the phase angle should be 0. In Q branch there should be no signal. The difference of the calculated value and the theoretical value is the phase error estimate. Another possibility is that the receiver first separately multiplies the I and Q-branch samples of the received reference sequence by the samples of that model sequence that best corresponds to the best decimation timing, whereafter the receiver separately sums up the results from each branch, so that there is obtained one I-branch value and one Q-branch value for calculating the phase error. From the point of view of the invention, the method used in this step for estimating the phase error is not essential as such.

According to a preferred embodiment of the invention, the receiver next estimates the frequency error, which describes the difference between the employed reception frequency and the real baseband of the signal. An advantageous method for estimating frequency error is to observe how the phase error changes from one symbol to another. This is described below, with reference to FIG. 4, where the blocks 60–62 describe the initialisation of different parameters and the decision whether a sufficient amount of SCH bursts (n=M) were received in order to make a given frequency correction. The receiver multiplies the complex samples of the model sequence that was above chosen to be most suitable by the complex samples of the received reference sequence in block 64, and defines the phase angle of each result within the range $[-\pi, \pi]$ in relation to the positive real axis. The definition of the phase angle takes place for instance according to a previously calculated arctan look-up table in block 65. In order to avoid a misleading jump in the angle group from positive values to negative in between the second and third quadrant of the phase coordinates, the receiver studies in blocks 66 and 67 how many of the angles are, in absolute value, larger than $\pi/2$ (i.e. 90 degrees) and adds, when necessary, the number $2\pi$ (i.e. 360 degrees) to the negative angle values in block 68. A suitable maximum value W for the amount of angles that were in absolute value larger than $\pi/2$ can be found by experimenting. In this angle group there is next matched a straight line, for instance by using the least square sum method in block 69. The angle coefficient of the matched straight line indicates the average phase shift $F_n$ per symbol during a reference sequence. When the symbol rate and the phase shift are known, the frequency error can be calculated in a known fashion.

On the basis of the received reference sequence, the receiver can also calculate the signal to noise ratio in block 63. The received reference sequence is multiplied by the model sequence corresponding to the best decimation timing and by the conjugate value of the above calculated phase error. The squares of the real parts of the obtained result are summed, and the sum is divided by the number of symbols in the reference sequence; the resulting quotient is the signal power estimate. Respectively, a variance of the imaginary parts of the result is an estimate of the noise power, in which case the signal to noise ratio is the ratio of the signal power to the noise power. This value can be used when defining the degree of averaging required of frequency estimates prior to correcting the frequency error. If the signal to noise ratio is worse than a given threshold value x2, the above estimated frequency parameters are discarded, and the whole synchronisation process is freezed in block 73. In this case, there are used certain prediction parameters—explained below—for changes in the timing of the prediction parameters and in the doppler frequency. In another case, the value of the signal to noise ratio in block 73 affects to which value (y1 or y2) is chosen as the threshold value M.

In this step of the method of the invention, the receiver has received a reference sequence contained in one BCCH burst, i.e. a SCH burst, and calculated on the basis thereof the estimates for the values of timing error, the reference of the phase error and of frequency error. Next it receives a tracking group formed by four successive BCCH bursts, the size whereof (four BCCH bursts) is obtained so that in the definitions of the I-CO Global Communications satellite telephone systems, there is named a given most important BCCH burst, which is repeated in the transmission at the interval of every four bursts. This particular burst contains, among others, information of eight local CCS frequencies. If the method of the invention is applied to other systems, or if the repetition frequency of essential information in successive BCCH bursts changes, the length of the burst group is most advantageously chosen so that one group always includes at least one data part containing essential information.

The timing section of tracking group operations is again described with reference to FIG. 3. At the beginning of the treatment of a tracking group, the receiver corrects the number "deci" describing the decimation point timing to correspond to the best decimation point, found above, in block 36. In the correction process it must be observed that if there are employed for instance the ordinals 0–7 and the old decimation point number 6, and the timing error correction is +3, the result 9 must be described within the range 0–7 without subtracting the number of samples per symbol (here 8). Now also the starting symbol, where the calculation of the received signal begins, is shifted one symbol later. Respectively, a negative result shifts the starting symbol, from which the calculation of the received signal begins, one symbol earlier. The description of the decimation point for a given interval, as well as the correction of the parameter StSy describing the starting symbol, are illustrated by using a somewhat different indexing method in the blocks 37–40 of FIG. 3. By the obtained ordinal corresponding to the decimation points, the decimation points are corrected. The received burst is filtered and decimated according to the estimated decimation points and stored to memory for processing.

The calculatory treatment of the first whole BCCH burst starts by re-estimating the timing error. Because the timing error already was corrected fairly accurately, the receiver now uses—in the blocks 41 and 42 of FIG. 3—only the optimum model sequence and the nearest preceding and succeeding model sequence (cf. the value interval of the index from −1 to 1), which reduces the amount of necessary calculation. The sample sequences received from the I and Q branches are in turn multiplied by the samples of each three model sequences, and the products are squared and summed. Among the obtained power values, there is selected the highest, and the number corresponding to that is the new distance from the optimum point.

An advantageous procedure that transmits information of the timing error in between the different bursts is the following: a distance from the employed decimation point, corresponding to a model distance rendering maximum power, is in block 43 inserted in a sliding filter, where the oldest distance value always falls out when a new one comes in. In this filter, all original values are zeroes, i.e. correspond to the optimum moment. Three values at the most suffice as the filter length. The average of the values contained by the filter is rounded to the nearest integral, and this integral is subtracted from all filter values in block 44. Said integral is used in the following burst so that to this integral, there is added the ordinal corresponding to the current decimation points, and the decimation points corresponding to the obtained ordinal are used in the following process. The correction is carried out to the next burst in succession. The sliding window is cleared after each burst group. The location of the decimation point is subjected to the same checkings and necessary corrections as was explained above, in relation to the blocks 37–40.

The phase error reference value estimation and frequency error estimation are carried out as was explained above, except that from now on, the reference sequence is the whole basic reference sequence, i.e. the SCH burst. The estimated frequency error is recorded in the memory like the frequency error calculated in the previous round, but the frequency is not yet corrected, because the statistic material in the calculation of the frequency error is still too limited.

In the phase error correction step proper, the aim is to calculate individual phase correction values for each decimated data sample received from the BCCH burst. Any known method can be used for this purpose. In the following description, we use a known feed forward type method as an example.

Phase estimation starts by removing the modulation. In the case of BPSK, there are two possibilities. The complex symbol of each BCCH burst is either multiplied by itself, or the complex sample (in this case the absolute value of the real and imaginary parts) serves as an address to a look-up table, from which there is obtained the angle value of the sample multiplied by two, in a form "cosine of the angle (real part) and sinus from the angle (imaginary part)". The look-up table only needs to cover one quadrant of the phase coordinates, because the final angle value can be concluded from the signs of the input values. When the input signal is in the second quadrant, the correct phase angle is 360 degrees minus the phase angle given by the look-up table. In the case of the third quadrant, the phase angle is the same as the phase angle obtained from the table. In the case of the fourth angle, the phase angle is the negation of the phase angle given by the table. Next the obtained complex values are averaged by taking into account N values on both sides of the sample to be averaged, where N is a suitably chosen integral. Now the length of the averaging window is 2*N+1 samples, and the averaging is carried out for the real and imaginary parts separately. The samples to be used in averaging are the data and reference sequence samples of the BCCH burst. An averaged estimate is not obtained for N first and N last samples, but these will be dealt with later on. The averaged real and imaginary parts are addresses to the look-up table, which gives the half of the angle of the input vector out. The next procedure is to remove the phase jumps caused by the halving of the angle. In this so-called "unwrapping" operation, there is studied the difference of two successive phase estimates (the difference of a later phase value from an earlier phase value). If the result is less than −145 degrees, 180 degrees are added to the latter phase value. If the result is more than 145 degrees, 180 degrees are subtracted from the latter phase value. All estimated averaged phase values are treated in similar fashion.

The next process step is the removal of ambiguity. Depending on the location of the SCH in the BCCH burst, the procedure is somewhat different. The location of the SCH, i.e. the reference sequence, in the BCCH burst will be fixed, but it was not yet decided when the present patent application was filed. There are two sensible alternatives for this location of SCH: either at the beginning of the BCCH burst, or in the middle of it. If the SCH is located at the beginning, ambiguity is removed by subtracting from the reference value, which was earlier calculated on the basis of SCH, the first phase value that was estimated according to the above described procedure. The result is added to all estimated phase values. A drawback in this location of the SCH is that in the case of frequency error, the phase has already rotated in between the symbol corresponding to the reference sequence (the middle part of the reference sequence) and the symbol corresponding to the first estimated phase. If the SCH is located in the middle of the BCCH burst, the phase value estimated for the respective symbol is subtracted from the reference sequence. The obtained result is again added to all estimated phase values.

The next step is to estimate the phase shift from the obtained phase values. There are several ways to do this, but one possibility is for instance to take the average of the last and the fifth last estimated phase value and the average of the first and fifth estimated phase value, subtract these from each other and divide the result by the average distance of these two in symbols. The obtained result is phase shift per symbol. If the SCH was located at the beginning, the data values which did not have an existing phase estimate are given phase estimates as follows. The estimates at the beginning are the same as the first phase estimate, and the phase estimates at the end are obtained by adding the estimated phase shift value to the last estimated phase value according to the following formula $$\alpha(L+k)=\alpha(L)+k^*\phi$$

where L is the index of the symbol corresponding to the last phase estimate, α is the phase estimate of the symbol corresponding to the index within the brackets, k=1, 2, 3, ... and φ is the calculated phase shift value per symbol. If SCH is in the middle of BCCH, the phase estimates of the final values are obtained as above, and the phase estimates of the initial values are also obtained from the above formula by changing the indexes (L is the first estimated phase value and k=−1, −2, −3, ... ). Now every data point has received an individual phase estimate, which can be used in the demodulation in the fashion described below.

The demodulation of the first BCCH burst ends by multiplying the complex data samples of the received burst by the respectively calculated conjugate values of the estimated phase shifts, and by then taking the real part of the result. In practice, the real part of a complex sample is multiplied by the real part of a normalised phase vector (or by the cosine of the phase angle), the imaginary part of the complex sample is multiplied by the imaginary part of the normalised phase vector (or by the sinus of the phase angle), and the results are summed up. Depending on whether it is desired to reserve a possibility for a more detailed further analysis of the result in the receiver or not, of the demodulated BPSK signal there is carried further either only a sign or a real number. All four bursts of the BCCH tracking group are subjected to the same operations, whereafter the first BCCH tracking group is demodulated.

On the basis of the average of the signal to noise ratio in the tracking group, it is determined whether the estimated frequency error values are sufficient, or is it still necessary to receive only SCH bursts, of which the frequency estimation is carried out. From the BCCH burst the frequency error was estimated in two different ways: from the SCH section (unit phase shift per symbol) and from phase estimation (same unit). Because these are independent ways to estimate the frequency error, the frequency error estimate of one BCCH burst is the average of these two. The frequency error estimate of a group, which will be used from now on of the frequency estimates of individual BCCH bursts is the average FTG and of the frequency error estimates estimated only of the SCH sections; the calculation of said FTG (Frequency tracking group) is represented as a separate block in FIG. 4.

Between the BCCH groups to be demodulated, the receiver must maintain and, when necessary, modify synchronisation parameters, in order to be able to control the timing shift caused by the clock difference of the receiver and transmitter, as well as the frequency shift caused by the change in the doppler frequency. These synchronisation parameters are estimated at regular intervals (for instance every 10 seconds) in a group of SCH bursts. FIG. 4, which was referred to earlier, is particularly connected to the treatment of the SCH tracking group. In each SCH sequence, there is estimated the timing and frequency error as well as the signal to noise ratio. On the basis of earlier results, there is also predicted the timing and frequency shift to the PCH, BCCH or SCH burst to be demodulated next.

In the first reference sequence of the SCH group, timing is estimated with all eight model sequences as was explained above. The deviation from the optimum timing is corrected according to the procedure described above, and with the successive sequences of the same group, there are only applied the optimum model sequence and the model sequences located on both sides thereof, as was explained above. The initial deviation from the optimum timing is recorded in the memory, and it is scaled in same fashion as other values in the timing window (see description above). Thus, in the end of each group, there is obtained the respective timing shift as compared to the previous group. By averaging these shifts, for instance for the duration of four groups with a timing window, there is estimated the timing shift per time unit. The obtained value can then be used for predicting the timing shift for the next PCH, SCH or BCCH group. The prediction is illustrated in blocks 50–52 of FIG. 3. Consequently, in the case of PCH, it is not necessary at all to estimate timing, but the shift of the decimation point can be predicted and corrected. In the SCH and BCCH groups, where timing is estimated, this shift can be predicted, corrected and taken as the initial value to the shift estimation; in the end its accuracy can be checked and it can be corrected within the above described sliding window.

Two different strategies can be applied in frequency estimation. This depends on the size of a single SCH group and on how many such groups are used in the estimation of the doppler rate change. The choice of strategy is based on the fact that the terminal device knows whether it gets its power from an external source or from its own battery. It is assumed that when the working power comes from the battery, the terminal speed changes slowly (the user walks on foot). The length of this group in frequency error estimation can be short, but the number of the groups in the doppler rate change estimation can be long. In another case, the user may be in a car (the terminal device gets its working power from an external source), in which case the car's speed may vary radically within a short period of time. Now the length of the group in frequency error estimation is long, but the number of groups in the doppler rate change estimation is short, so that the receiver is better able to observe the changes in the doppler frequency rate. The frequency error estimation of a group was described earlier, both with pure SCH and when the whole BCCH is demodulated. Next we shall explain the estimation algorithm for the doppler rate change.

In the estimation of the doppler rate change, there is used a similar straight line fitting, using the least square sum method, as in frequency error estimation from the SCH. After signal acquisition and handover, the frequency error estimation groups are somewhat longer, because the frequency error estimate obtained from the group is directly used for frequency correction. The frequency error of the next group is the residual frequency error of the previous group+doppler shift between the respective groups. When frequency is corrected to a channel oscillator, the correction value is always subtracted from the frequency error estimates located in the sliding window. This frequency correction value is also subtracted from the channel oscillator, which mixes the desired channel to baseband. In practice the frequency correction value is the phase shift during a symbol; thus the phase shift to be subtracted from the channel oscillator and taking place during a symbol is divided by the oversampling value. When a sufficient amount of frequency error estimates (the threshold value A of blocks 74 and 77 in FIG. 4) is stored in the memory, the doppler rate change estimation is started. The frequency change is modelled in blocks 79 and 75 by a straight line, in the equation of which y=a*x+b, the coefficients a and b are constants defined by the least square sum method. By giving time x a desired relative moment in time, when the frequency should be predicted, we obtain the correction value y. Let the number of groups to be employed in the estimation process be for instance Q, and let the relative time in between the groups be a constant 1. The new frequency estimate should be predicted after the relative period 1 from the previously estimated group. This is y (new estimate)= a*(Q+1)+b. When using the prediction, the new estimate is fed to the channel oscillator, and this value is subtracted from the old frequency error estimates stored in the memory (except from the oldest, which will not be used anymore).

PCH or the Paging Channel data part is BPSK modulated like BCCH. However, its reference sequence is only 8 symbols long. Thus the receiver does not calculate timing nor frequency error from PCH, but uses the above described prediction methods for timing and frequency. The phase is still estimated in PCH. The reference sequence is used for calculating the phase reference value (as above) and the phase of each symbol is estimated in the same fashion as above. The demodulation of the signal is also carried out similarly as with the BCCH data.

The above described demodulation of a BCCH tracking group was particularly connected to the processing of the first BCCH burst after finding the signal. When the receiver is in idle mode, it receives and demodulates BCCH burst groups advantageously about once a minute. When the idle mode continues, the treatment of BCCH tracking groups differs from the first burst group only in one sense: there are utilised predictions, calculated in the above described fashion, related to timing shift and doppler rate change between the tracking groups. Moreover, in further processing, the timing of decimation is already known to such detail, that the ambiguity—suggested above as one alternative—as to whether the initial symbol is a certain symbol or one of two adjacent symbols does not arise.

When there is a remarkable contradiction between the signal to noise ratio estimate and the bit error ratio (BER) of the demodulated signal, or when the synchronising parameters have been frozen for a while, the receiver must find out whether this is due to the fact that the synchronisation is failed (=error situation) or whether the signal has been missed. This is carried out by measuring the BCCH power (timing has never shifted so much that this could not be done in a reliable way) and the noise power of the noise section following the FCH for the duration of the burst. Thus we obtain (S+N)/N. If this value is lower than for example 1.5 or some other given threshold value, the signal is missed, and the receiver moves to "out of coverage" mode, which is not dealt with here. In another case, the receiver synchronisation has failed, and the process of recovery from the error situation can be built in the demodulation procedure. This mainly means a situation where, in tracking the timing, the symbols of the model sequence do not, when performing multiplication, multiply respective symbols in the received sample stream, but either earlier or later symbols. Another alternative is that the frequency error has got completely out of hand. The return to synchronisation is carried out by applying a lighter version of the acquisition procedure, i.e. there is first calculated the frequency error from two FCH bursts. This error must be very near to zero frequency error, because frequency cannot have gone too far astray. If the absolute value of the frequency error surpasses the threshold value, which can be for instance about 400 Hz, the receiver shifts to "out of coverage" mode. In other cases the frequency error is corrected, after the fine synchronisation of the frame is first taken care of Simultaneously as the samples from two FCH bursts were received, the receiver also stored two SCH bursts and for example 10 samples around them. The fine synchronisation of the frame is carried out by using these samples, according to the method described in the Finnish patent application "Signal acquisition in a satellite telephone system" by the same applicant, whereafter the receiver begins signal tracking according to the method described in the present application.

The mutual order of the procedures explained above as part of the method of the invention, as well as the practical realisation of the method steps described by way of examples, do not limit the invention, but the invention can be modified in many ways within the scope of the following claims.

What is claimed is:

1. A method for synchronising a receiver to a received signal having a symbol sequence with a certain frequency and symbol timing which are not accurately known to the receiver, comprising the steps converting the symbol sequence of a received signal into a sample sequence, calculating a number of model sequences, each of which represents a known response of said receiver to certain known synchronisation errors, comparing said sample sequence with said model sequences to find the model sequence that best corresponds to said sample sequence, and using the correspondence between the model sequence found to best correspond to said sample sequence and the corresponding known synchronization error to synchronize said receiver to said received signal symbol sequence.

2. A method according to claim 1, further comprising the steps of:

producing oversampled reference sequences from said received signal symbol sequence, decimating said oversampled reference sequences at different decimation points having an optimum decimation point, forming a given number of model sequences describing the response of said receiver to the decimation of a given oversampled reference sequence which is shortened at the beginning and the end, at different decimation points in said decimation, so that each model sequence indicates a given distance of its corresponding decimation point from the optimum decimation point, forming a first sample sequence by receiving and oversampling from said received signal symbol sequence the first reference sequence, which essentially corresponds to said given oversampled reference sequence as cut at the beginning and the end, forming a second sample sequence by decimating said first sample sequence at a given first decimation point, correlating said second sample sequence and all said model sequences, studying the correlation of said second sample sequence and all said model sequences, and correcting said first given decimation point by an amount, corresponding to the distance from the optimum decimation point indicated by that model sequence which best correlates with said second sample sequence.

3. A method according to claim 2, further comprising the steps of:

forming a third sample sequence by receiving and oversampling from said received signal symbol sequence, after receiving said first sequence, a second sequence which essentially corresponds to said given oversampled reference sequence as cut at the beginning and end, forming a fourth sample sequence by decimating said third sample sequence at the decimation point corrected above, studying the correlation of said fourth sample sequence and only part of said model sequences, and further correcting said corrected decimation point by an amount corresponding to the distance from the optimum decimation point indicated by that model sequence which —best correlates with said fourth sample sequence.

4. A method according to claim 2, further comprising the steps forming a number of phase angles by studying the phase of the samples contained in at least one of said second and fourth sample sequences, defining the average shift of phase angle between two successive samples, said two successive samples corresponding to two successive symbols of the received signal symbol sequence, and defining the error of the frequency used in the signal reception baseband mixing by multiplying said average change of the phase angle between two successive samples by the known symbol rate of the received signal symbol sequence.

5. A method according to claim 4, further comprising the steps of:

forming several sample sequences by receiving, oversampling and decimating from said received signal symbol sequence such sections that essentially correspond to said given oversampled reference sequence, defining in each sample sequence, the average change of the phase angle between two successive samples, said two successive samples corresponding to two successive symbols of the received signal symbol sequence, defining per each sample sequence, the error of the frequency used in the signal reception baseband mixture, by multiplying said average change of the phase angle between two successive samples by the known symbol rate of the received signal symbol sequence, calculating an average of all defined errors of the frequency used in the baseband mixing, and correcting said frequency used in the signal reception baseband mixing on the basis of the calculated error average.

6. A method according to claim 2, further comprising the steps of:

forming several sample sequences by receiving, oversampling and decimating from said received signal symbol sequence such sections that essentially correspond to a given data sequence, said data sequence being repetitive and containing said given oversampled reference sequence as a partial group, defining from each sample sequence, an average change between two successive samples, said two successive samples corresponding to two successive symbols of the received signal symbol sequence, defining, per each sample sequence, the error of the frequency used in the signal reception baseband mixing by multiplying the average change of the phase angle between two successive samples by the known symbol rate of the received signal symbol sequence, calculating an average of all defined errors of the frequency used in the baseband mixing, and correcting said frequency used in the signal reception baseband mixing on the basis of the calculated error average.

7. A method acording to claim 5, wherein the created sample sequences form a group, and several groups like this are received at given intervals, so that said frequency used in the signal reception baseband mixing is predictably corrected prior to receiving a certain group, on the basis of the error correction trend indicated by the groups that were received earlier.

8. A method according to claim 7, further comprising the steps of:

studying, among a number of several successive groups, what is the change in the doppler shift of the received signal symbol sequence, and correcting said frequency used in the signal reception baseband mixing predictably prior to the reception of a given group, on the basis of the error correction trend of the doppler shift indicated by the groups that were received earlier.

9. A method according to claim 7, further comprising the steps of:

studying whether the device used as a receiver gets its working power from its own battery or from an external source, and defining the number of sample sequences belonging to one group on the basis of the results of said examination.

10. A method according to claim 9, wherein when the examination shows that said receiver device gets its working power from its own battery, the number of sample sequences belonging to one group is defined to be smaller than in the case where the examination shows that said receiver device gets its working power from an external source.

11. A method according to claim 9, wherein when the examination shows that said receiver device gets its working power from its own battery, the number of groups belonging together is defined to be larger than in the case where the examination shows that said receiver device gets its working power from an external source.

12. A receiver for receiving and synchronizing to a received signal havung a symbol sequence with a certain frequency and symbol timing which are not accurately known to the receiver, comprising:

means for converting a received signal symbol sequence into a sample sequence, means for storing a number of model sequences, each of which represents the known response of said receiver to a certain known synchronization error, means for comparing said sample sequence with said model sequences to find the model sequence that best corresponds to said sample sequence, and means for synchronizing said receiver to said received signal symbol sequence using the correspondence between the model sequence found to best correspond to said sample sequence and the corresponding known synchronization error.

13. A receiver according to claim 12, further comprising:

means for producing oversampled reference sequences, means for forming a given number of model sequences describing the response of said receiver to the decimation of a given oversampled reference sequence which is shortened at the beginning and the end, at different decimation points, so that each model sequence indicates a given distance of the decimation point from an optimum decimation point, means for forming a first sample sequence by receiving and oversampling a first sequence from said received signal sequence, which essentially corresponds to said given oversampled reference sequence as cut at the beginning and the end, means for forming a second sample sequence by decimating said first sample sequence at a given first decimation point, means for correlating said second sample sequence and all said model sequences, means for studying the correlation of said second sample sequence and all said model sequences, and means for correcting said first decimation point by an amount, corresponding to the distance from the optimum decimation point indicated by that model sequence which best correlates with said second sample sequence.

14. A receiver according to claim 13, further comprising:

means for forming a third sample sequence by receiving and oversampling from said signal, after receiving said first sequence, a second sequence which essentially corresponds to said given oversampled reference sequence as cut at the beginning and end, forming a fourth sample sequence by decimating said third sample sequence at the decimation point corrected above, studying the correlation of said fourth sample sequence and only part of said model sequences, and further correcting said corrected decimation point by an amount corresponding to the distance from the optimum decimation point indicated by that model sequence which best correlates with said fourth sample sequence.

15. A receiver according to claim 13, further comprising:

means for forming a number of phase angles by studying the phase of the samples contained in said second or fourth sample sequence, means for defining the average shift of phase angle between two successive samples, said two successive samples corresponding to two successive symbols of the received signal, and means for defining the error of the frequency used in the signal reception baseband mixing by multiplying said average change of the phase angle between two successive samples by the known symbol rate of the received signal.

16. A receiver according to claim 15, further comprising:

means for forming several sample sequences by receiving, oversampling and decimating from said signal such sections that essentially correspond to said given oversampled reference sequence, means for defining in each sample sequence, the average change of the phase angle between two successive samples, said two successive samples corresponding to two successive symbols of the received signal, means for defining per each sample sequence, the error of the frequency used in the signal reception baseband mixture, by multiplying said average change of the phase angle between two successive samples by the known symbol rate of the received signal, means for calculating an average of all defined errors of the frequency used in the baseband mixing, and means for correcting said frequency used in the signal reception baseband mixing on the basis of the calculated error average.

17. A receiver according to claim 13, further comprising:

means for forming several sample sequences by receiving, oversampling and decimating from said signal such sections that essentially correspond to a given data sequence, said data sequence being repetitive and containing said given oversampled reference sequence as a partial group, means for defining from each sample sequence, an average change between two successive samples, said two successive samples corresponding to two successive symbols of the received signal, means for defining, per each sample sequence, the error of the frequency used in the signal reception baseband mixing by multiplying the average change of the phase angle between two successive samples by the known symbol rate of the received signal, means for calculating an average of all defined errors of the frequency used in the baseband mixing, and means for correcting said frequency used in the signal reception baseband mixing on the basis of the calculated error average.

18. A receiver according to claim 17, further comprising:

means for forming the created sample sequences into a group, and for receiving several of said groups at given intervals, means for predictably correcting said frequency used in the signal reception baseband mixing prior to receiving a certain group, on the basis of the error correction trend indicated by the groups that were received earlier.

19. A receiver according to claim 18, further comprising:

means for studying, among a number of several successive groups, what is the change in the doppler shift of the received signal, and means for correcting said frequency used in the signal reception baseband mixing predictably prior to the reception of a given group, on the basis of the error correction trend of the doppler shift indicated by the groups that were received earlier.

20. A receiver according to claim 18, further comprising:

means for studying whether the device used as a receiver gets its working power from its own battery or from an external source, and means for defining the number of sample sequences belonging to one group on the basis of the results of said examination.

21. A receiver according to claim 20, further comprising means for defining, when the examination shows that said receiver device gets its working power from its own battery, the number of sample sequences belonging to one group to be smaller than in the case where the examination shows that said receiver device gets its working power from an external source.

22. A receiver according to claim 20, further comprising means for defining, when the examination shows that said receiver device gets its working power from its own battery, the number of groups belonging together to be larger than in the case where the examination shows that said receiver device gets its working power from an external source.

* * * * *